Dec. 24, 1957     H. K. FOSTER     2,817,743
AUTOMATIC COFFEE PERCOLATOR

Filed March 8, 1954     2 Sheets-Sheet 1

INVENTOR
HOYT K. FOSTER
BY
ATTORNEYS

Dec. 24, 1957 H. K. FOSTER 2,817,743
AUTOMATIC COFFEE PERCOLATOR
Filed March 8, 1954 2 Sheets-Sheet 2
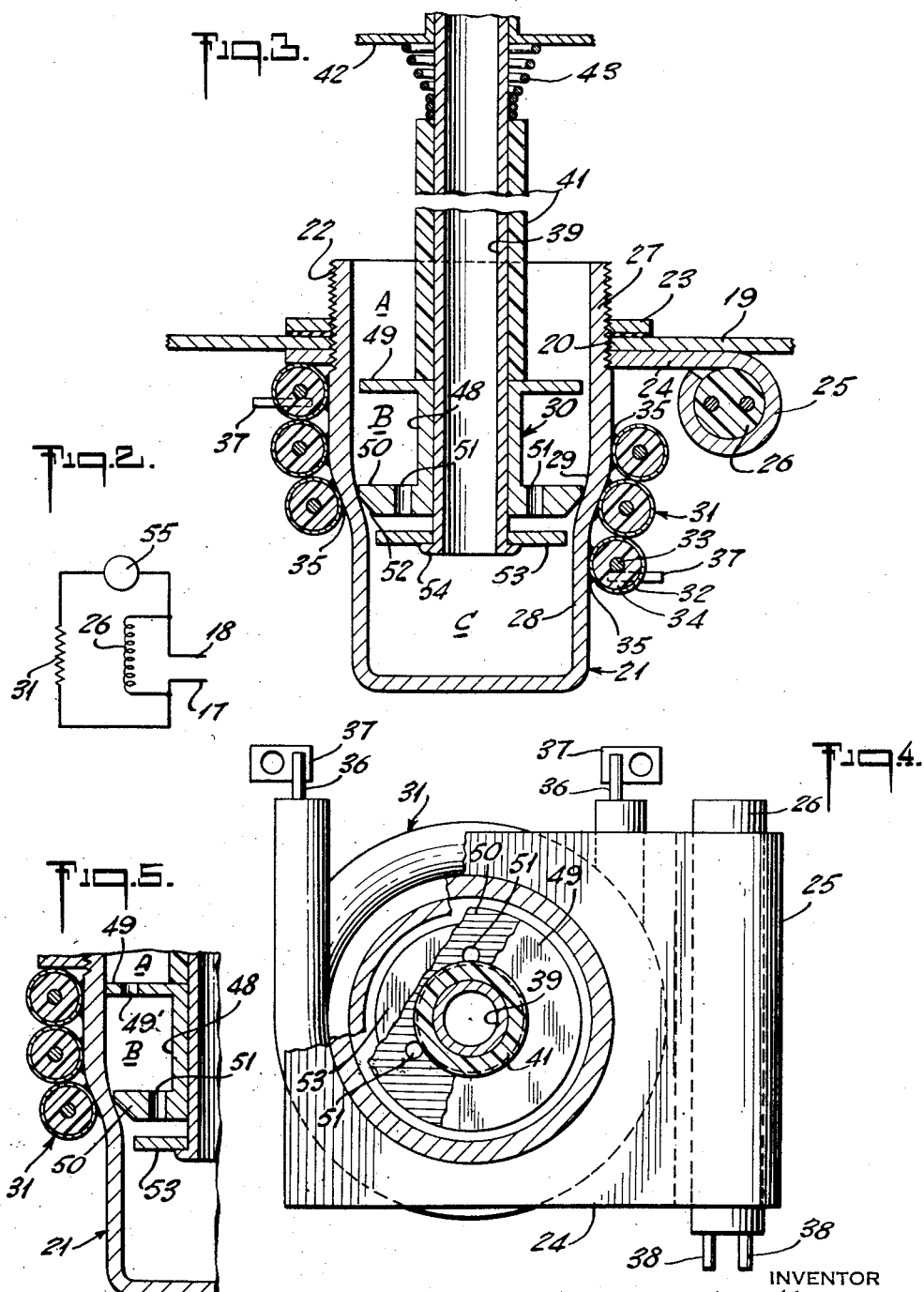
INVENTOR
HOYT K. FOSTER
BY
Morgan Finnegan Durham & Pine,
ATTORNEYS

United States Patent Office 2,817,743
Patented Dec. 24, 1957

2,817,743
AUTOMATIC COFFEE PERCOLATOR

Hoyt K. Foster, Hollis, N. Y., assignor to S. W. Farber, Inc., New York, N. Y., a corporation of New York Application March 8, 1954, Serial No. 414,770

7 Claims. (Cl. 219—44)

This invention relates to percolators and more particularly to automatic electric percolators that will function more rapidly and effectively and automatically discontinue operation upon completion of the percolating process. This invention constitutes in certain aspects an improvement of the invention disclosed in my prior application Serial No. 382,788 filed September 28, 1953 and in other aspects is a separate invention.

Objects and advantages of the invention will be set forth in part hereafter and in part will be obvious herefrom, or may be learned by practice with the invention, the same being realized by means of the instrumentalities and combinations pointed out in the appended claims.

The invention consists in the novel construction, arrangements, combinations and improvements herein shown and described.

The accompanying drawings, referred to herein and constituting a part hereof, illustrate certain embodiments of the invention, and together with the description, serve to explain the principles of the invention.

It has been the practice in the construction of percolating devices, such as the more well known coffee percolator, to provide a suitable liquid container having a shallow well in the bottom, a percolating pump cooperating with said well and means for heating the water as it enters the well.

Although it is desirable to raise the water temperature rapidly in a percolator in order to shorten the processing time, attempts to use large heating units have been unsuccessful. Violent steaming within the percolating well occurs which disturbs and otherwise impedes the beginning of normal percolating action. In the case of coffee percolators this action often adversely affects both the flavor and strength of the coffee.

Another disadvantage with present practices is that proper and continued percolating action cannot be obtained without a sufficiently high head of water in the pot in order to force the water into the percolating well against the pressure of the steam generated therein. While decreasing the size of the heating unit will minimize this problem it also decreases the speed of heating. As a result present percolators are limited to processing a substantially full pot of water in order to enable the use of the highest power heater that will properly process that quantity of water in the shortest time. The functional and esthetic appearance demands of present day users for large capacity coffee pots with small outer dimensions has of course aggravated these difficulties.

Broadly, the invention in one aspect concerns the use of high wattage heating units without the attendant violent steaming and other adverse effects encountered with prior percolators particularly when small quantities of coffee are to be brewed. As a result quick initiation and completion of the percolating action can be attained without adversely affecting the strength or flavor of the coffee. Moreover the pot can be filled only to a fraction of its capacity so that a ten cup percolator for instance may be used for brewing as little as two or three cups of coffee in which case the processing time is proportionally reduced. In addition the elements of this new and improved structure are designed and arranged to facilitate repair and maintenance which is a highly important factor especially in electrical devices.

These ends are attained in part by the employment of an improved well and pump assembly, with the well having a substantial portion thereof disposed below the bottom of the vessel or container. The percolator pump tube with the coffee basket mounted thereon extends deeply into the well and below the bottom of the pot. The pump functions to divide the well into a series of distinct chambers with means for permitting water to flow successively from one chamber to the next. A large capacity heating element disposed about the well increases the temperature of the water as it passes from one chamber to the next so that the water reaching the lowermost chamber is at substantially the temperature required for the percolating action.

Another aspect of the invention is the provision of an improved well and heating element structure that includes not only a high power well heater but in addition a lower power heater operable to maintain the temperature of the brewed coffee after percolation has been completed. The well together with the cooperating pump are characterized by their simplicity and durability and are treated to resist the corrosive effects of high temperatures in the presence of water. In addition the invention contemplates the insulation of the pump tube to enhance the percolating action and the provision of a control device responsive to halt the percolating action when the coffee has been properly processed leaving the auxiliary heater to maintain a desired coffee temperature.

The above and other objects will become more apparent in the following description and accompanying drawings forming part of this application.

Of the drawings:

Figure 2 is a heating circuit for the embodiment of the invention shown in Figure 1;

Figure 3 is an enlarged cross sectional view of the percolator well and pump assembly;

Figure 4 is a plan view of the assembly shown in Figure 3; and

Figure 5 is a fragmentary view of another embodiment of the invention.

Figure 1:
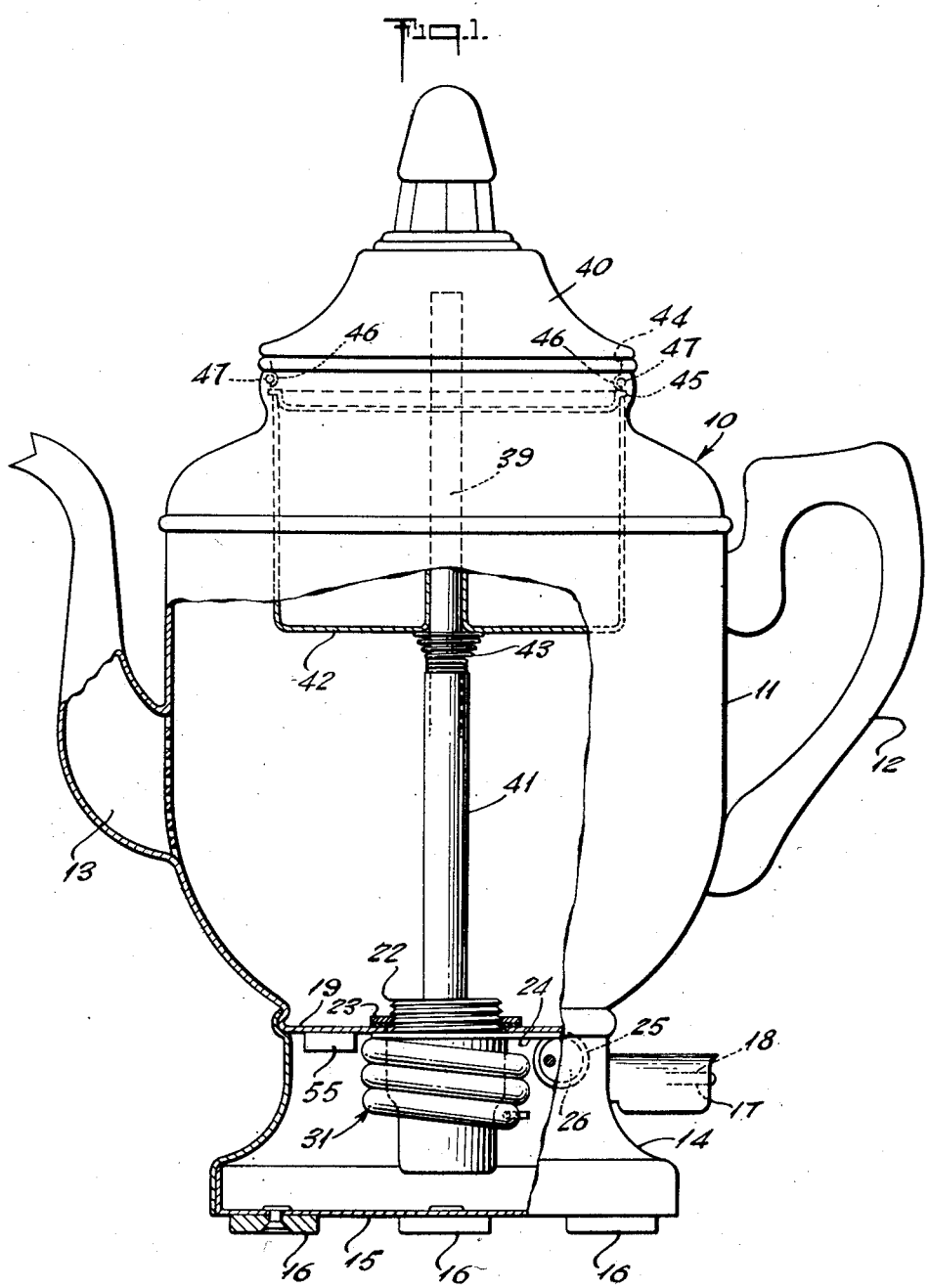
Figure 1 is a side elevation partially broken away of an electric percolator in accordance with the invention.

Referring now to the illustrative embodiment of the invention shown by way of example in the drawings, the percolator vessel is denoted generally by the numeral 10 and is provided with a main body part 11 having a handle 12 and a spout 13. The body part 11 is supported by an auxiliary base 14 suitably secured to the body part and having a bottom closure member 15 carrying supporting means or feet 16 which are preferably formed of a nonmetallic insulating material. On one side of the base 14 is an electrical connector having pins 17 and 18 for receiving suitable electrical connecting means.

The vessel 11 is provided with an integral bottom part 19 having a central opening 20 preferably situated in the center thereof. Supported within this opening is a relatively deep well 21 having a threaded end section 22 extending through the opening and cooperating with a locking nut 23 on the top side of the bottom member 19. Beneath the bottom 19 and threadably attached to the well part 22, is a flat plate 24 which lies directly against the bottom 19. This plate is provided with a curved or cylindrical section 25 disposed on one side of the well 21 for carrying an auxiliary heater 26. In order to seal the well 21 in the opening 20, a thin sealing washer is positioned between the locking nut 23 and the bottom plate 19.

The well 21 includes two integrally formed sections 27 and 28, with the upper section 27 being of larger diameter than the lower section 28. These sections are preferably joined by a gentle sloping section 29 adapted to receive and support the pump assembly 30 as will be described. Surrounding that part of the well 21 below the plate 19, is a high power electrical heating element 31 of about 1000 watts capacity. This element is preferably of the type having a metal casing 32 surrounding the heating wires 33 and insulated therefrom by ceramic-like material 34. This element 31 is wound about the well 21 to provide about three full turns and is distributed so as to provide about 60 percent of the heat above the sloping section 29 and about 40 percent below. In order to effect a high coefficient of heat transfer to the well 21, and insure dependable, long life operation, the heating coil 31 is preferably brazed or welded to the well as indicated by the numeral 35. The ends 36 of the coil 31 are each provided with suitable terminals 37 for the attachment of the connecting wires. The auxiliary heating element 26, is constructed similarly to element 31 and is provided with suitable terminals 38 for connection with the terminals 17 and 18.

The pump assembly 30 is mounted on the lower end of a tube 39 which extends upwardly to a point within the cover 40 of the vessel 11 as shown in Figure 1. This tube is provided with a cylindrical insulating member 41 and slidably carries near the upper end a perforated coffee basket 42. Between the basket 42 and the upper end of the insulator 41, is a conical coil spring 43 which tends to urge the basket upwardly. The cover 40 however, is arranged with a downwardly extending flanged part 44 adapted to engage the upper edge 45 of the basket 42 and hold it in a depressed position. In order to secure the cover to the body 11 against the action of spring 43, suitable locking means such as indented portions 46 on the cover flange 44 and cooperating projections 47 on the body part 11 may be provided. With this arrangement the pump 30 is seated firmly in the well 21 at all times and thereby provides more efficient and effective percolating action.

The pump 30 comprises a double flanged member 48 tightly fitted on the tube 39 and spaced from the lower end thereof. This member includes an integrally formed upper flange 49 having its periphery spaced from the internal wall of the well 21 and a lower flange 50 of considerably thicker section. The flange 50 is provided with one or more holes 51 and has its peripheral edge tapered as shown at 52 to provide a firm seat against the tapered well portion 29. While a firm seat is secured between the flange 50 and the well 21, at no time do they become fixedly engaged but rather the pump 30 moves upwardly and downwardly under the action of spring 43 as a result of any differential expansion that may occur between the pump 30 and well 21. Beneath the flange 50, is a valve seat plate 53 loosely engaging the tube 39 and retained thereon by a small outwardly turned lip 54 on the bottom end of the tube. While the well 21 is preferably formed of brass, and the pump 30 and tube 39 are preferably made of aluminum, it is apparent that any suitable material may be employed. In order to prevent corrosion of these elements however, they are preferably plated with a corrosion resistive material such as chromium or the like.

In order to control the operation of this percolator so that the primary heater 31 is turned off when the coffee has been properly brewed, a thermostat 55 is disposed on the underside of the bottom member 19 so that it will respond substantially to the water temperature within the vessel 11. The function of this thermostat is illustrated by the circuit diagram of Figure 2. It will be observed that the auxiliary heater 26 is connected directly across the input terminals 17 and 18 while the primary heater 31 is connected in series with the thermostat 55 and then across the terminals 17 and 18. Thus when energy is applied to the coffee pot to brew coffee, both heating elements are energized. However, as soon as a predetermined temperature is reached indicating that the brewing has been accomplished, thermostat 55 is actuated to open the primary heater circuit. The auxiliary heater however, remains energized to keep the coffee hot.

In operation of this invention the vessel 11 is filled with the amount of water required for a desired number of cups of coffee, coffee is placed in the basket 42 and the basket and pump assembly are inserted in the manner above described. The terminals 17 and 18 are then connected to a suitable source of power. Both the primary and auxiliary heaters will be energized and as soon as the primary heater 31 arrives at its operating temperature, the water in the well 21 will be heated and forced upwardly through tube 39 under the action of the pump 30. Since the heater 31 is of large capacity this action will take place very rapidly.

From Figure 3, it will be seen that the pump 30 actually divides the well 21 into essentially three separate and distinct chambers A, B and C. The heating element 31 however, surrounds chamber B and part of chamber C so that the heat dissipated in each chamber will successively increase from chamber A to chamber C. Thus water entering chamber A will be preheated before entering chamber B. In chamber B the water will attain a temperature close to boiling whereupon it flows into chamber C and attains a steam generating temperature. While hot water normally tends to rise this action is impeded by the pump flanges 49 and 50 and the weight of the column of water on the well 21. As a result extremely rapid brewing is accomplished. In addition to this improved water heating and pumping action, the pump flange 50 firmly contacts the well 21 and thus heat is rapidly and continuously transferred through it to the tube 39 and coffee basket 42. Since the tube 39 is insulated by the sleeve 41, little heat will be lost to the water so that the coffee basket will become heated more rapidly and the water pumped through tube 39 will maintain its relatively high temperature. This further accelerates the brewing time and tests have indicated eight to ten average size cups of coffee can be brewed in as little as 5 to 8 minutes depending of course upon the initial water temperature and line voltage applied to the terminals 17 and 18. Moreover a lesser amount of coffee can be brewed in proportionally shorter time so that in a ten cup percolator as little as two cups may be brewed while attaining the same flavorful and tasteful coffee obtained when the full amount of coffee is brewed.

As soon as the water (coffee) temperature has reached a predetermined point, the thermostat 55 disconnects the primary heater 31 to stop the brewing action. The coffee however, will remain heated under the action of the auxiliary heater as long as the percolator remains connected with the power source.

As discussed more completely in my prior application for United States patent and referred to above, present percolators attain a water temperature of 190° F. to 200° F. in about 17 minutes and a coffee basket temperature of 180° F. in 6 to 7 minutes and a 200° F. basket temperature in 14 to 18 minutes. With this invention however, the basket temperature reaches about 180° F. in less than 1 minute and 200° in less than 6 minutes. In a percolator designed to accommodate 50 ounces of water, it has been found that with this improved structure it will raise the temperature of the full vessel to 190° F. in about 8 minutes. With less water, the high basket and water temperatures are attained in even less time while with as little as 10 ounces of water the complete brewing time is less than 3 minutes.

Another feature of the invention is the simplicity of the well and heater structure which essentially constitutes an integral assembly that may be quickly and easily replaced.

Figure 5 is another modification of the invention and shows a fragmentary portion of the well as illustrated in Figure 3. In these figures like numbers have been used to denote like elements. With this modification, the baffle or flange 49 of the pump 48 is of enlarged diameter and closely fits the inside of the well 21 while holes 49' are provided for transfer of water from the upper chamber A to the intermediate chamber B.

While only certain embodiments of the invention have been illustrated and described, it is apparent that modifications, alterations and changes may be made without departing from the true scope and spirit thereof.

What is claimed is:

1. In a percolator having a body member and a bottom wall, a well mounted in said wall and opening into said body member, a pump in said well and a tube extending upwardly from said pump, said pump including a lower flange member spaced from the bottom of the well to define a heating chamber and extending outwardly from said tube to contact the wall of said well, said flange having at least one opening therein to permit access to the chamber, a movable valve member disposed below said lower flange, an upper flange extending outwardly from the tube and spaced from said lower flange to define a restricted access to said well said upper and lower flanges defining a preheating chamber within said well and said upper flange forming at least one restricted opening into said preheating chamber, and heating means associated with said well.

2. In a percolator according to claim 1 wherein said tube extends through said flanges and said valve comprises a washer-like member slidably engaging said tube, said tube having a flared end part to retain said valve in slidable engagement therewith.

3. In a percolator according to claim 1 wherein said upper flange slidably engages the wall of said well and has at least one opening therein.

4. A percolator pump comprising a well, heating means surrounding said well and a pump removably seated in said well, said pump including a central tubular member, a lower member extending outwardly from said tubular member at a point spaced from the bottom thereof to form a heating chamber with at least one restricted opening therein, a valve member below said lower member and movable relative thereto, and an upper flange-like member spaced from the lower member to define a second chamber within the well, said upper member forming a restricted access opening to said second chamber.

5. A percolator pump according to claim 4 wherein said upper member closely engages said well and has an opening therein.

6. A heating unit for a percolator of the instantaneous type comprising a heating chamber, a resistance heater positioned around and adjacent the wall of said heating chamber, a lower member positioned within the heating chamber and supported by the wall of said heating chamber, and provided with water-admitting apertures, a fountain tube secured to and supported by said lower member, a washer loosely positioned on the lower end of said fountain tube, below said lower member, and adapted to register with the apertures in the lower member, and a baffle member closely surrounding the fountain tube and positioned at a spaced distance above the lower member, portions of said baffle member cooperating with the upper part of the heating chamber to define a preheating chamber therein, said baffle defining at least one restricted opening through which limited amounts of cool water can enter said preheating chamber, the preheated water from said preheating chamber then passing through the lower member into the bottom of said heating chamber.

7. A heating unit according to claim 6 wherein said restricted opening constitutes at least one opening formed in said baffle chamber.

References Cited in the file of this patent
UNITED STATES PATENTS

| | | |
|---|---|---|
| 135,544 | Grigsby et al. | Feb. 4, 1873 |
| 913,293 | Holley | Feb. 23, 1909 |
| 1,008,267 | Holley | Nov. 7, 1911 |
| 1,077,289 | Nash | Nov. 4, 1913 |
| 1,475,334 | Warner | Nov. 22, 1923 |
| 1,674,270 | Wentorf et al. | June 19, 1928 |
| 2,025,302 | Olds | Dec. 24, 1935 |
| 2,107,924 | Adams | Feb. 8, 1938 |
| 2,175,727 | Graham | Oct. 10, 1939 |
| 2,213,723 | Smith | Sept. 3, 1940 |
| 2,248,595 | Weeks | July 8, 1941 |
| 2,617,352 | Olson et al. | Nov. 11, 1952 |
| 2,658,134 | Kircher | Nov. 3, 1953 |